US011731670B2

(12) United States Patent
Grahn et al.

(10) Patent No.: US 11,731,670 B2
(45) Date of Patent: Aug. 22, 2023

(54) HOLDER FOR MOUNTING A SECOND PART ON A MAIN STRUCTURE BETWEEN CAR BODY ENDS OF A RAIL VEHICLE

(71) Applicant: DELLNER COUPLERS AB, Falun (SE)

(72) Inventors: Arvid Grahn, Falun (SE); Fredrik Harrysson, Gustafs (SE)

(73) Assignee: DELLNER COUPLERS AB, Falun (SE)

( * ) Notice: Subject to any disclaimer, the term of this patent is extended or adjusted under 35 U.S.C. 154(b) by 848 days.

(21) Appl. No.: 16/642,659

(22) PCT Filed: Sep. 4, 2018

(86) PCT No.: PCT/SE2018/050886
§ 371 (c)(1),
(2) Date: Feb. 27, 2020

(87) PCT Pub. No.: WO2019/045634
PCT Pub. Date: Mar. 7, 2019

(65) Prior Publication Data
US 2020/0255040 A1  Aug. 13, 2020

(30) Foreign Application Priority Data

Sep. 4, 2017  (SE) .................................... 1751069-4

(51) Int. Cl.
*B61G 7/10* (2006.01)
*B61G 5/08* (2006.01)
(Continued)

(52) U.S. Cl.
CPC ................ *B61G 7/10* (2013.01); *B61G 5/08* (2013.01); *B61G 7/12* (2013.01); *B61G 9/20* (2013.01);
(Continued)

(58) Field of Classification Search
CPC ... B61G 7/10; B61G 7/12; B61G 9/20; B61G 9/22; B61G 9/24; B61G 5/08; B61G 5/10; B60L 2200/26
(Continued)

(56) References Cited

U.S. PATENT DOCUMENTS 1,130,692 A * 3/1915 Haseltine ................. B61G 9/22
213/68
1,326,293 A * 12/1919 Schrader .................. B61G 5/08
285/71
(Continued)

FOREIGN PATENT DOCUMENTS

CN  1906073 A   1/2007
CN  201376575 Y  1/2010
(Continued)

*Primary Examiner* — Zachary L Kuhfuss
(74) *Attorney, Agent, or Firm* — Dilworth & Barrese, LLP

(57) ABSTRACT

The present invention relates to a holder for mounting a second part on a main structure between car body ends of a rail vehicle, comprising —a first holding structure having a first contact surface, the first holding structure being configured to be attached to a main structure; —a second holding structure having a second contact surface, the second holding structure being configured to be attached to a second part, and the second holding structure further being arranged to be mounted on the first holding structure with one of the first and second contact surfaces resting on the other; —a fastening device for fastening the second holding structure to the first holding structure to form a mounted state, the first and second contact surfaces being pressed against each other in the mounted state, and wherein the first and second contact surfaces in the mounted state each extend at a first angle in relation to a horizontal axis, said first angle ($\alpha$) being more than 1 degree and less than 30 degrees, and wherein the fastening device (53) extends in a (Continued)

Figure 1:
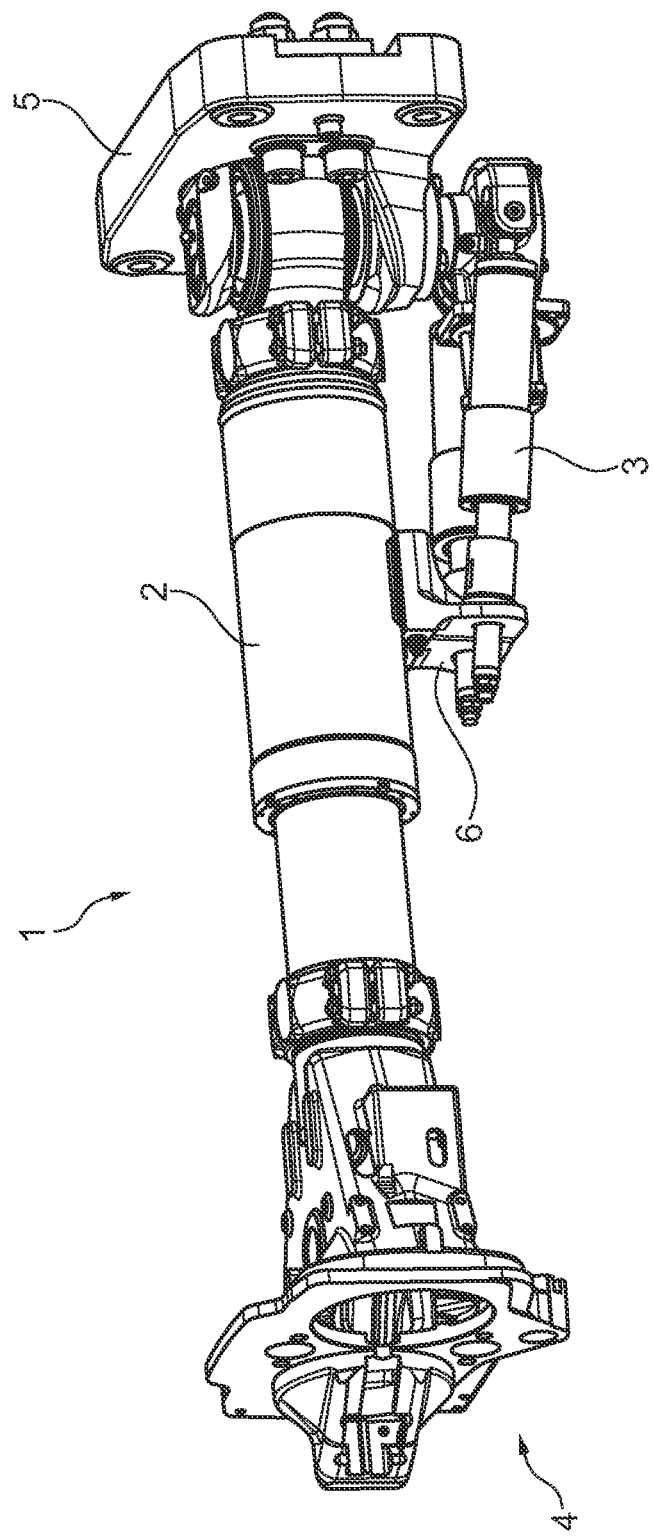

direction parallel to or coinciding with the horizontal axis (A).

20 Claims, 9 Drawing Sheets

(51) Int. Cl.
  *B61G 7/12* (2006.01)
  *B61G 9/20* (2006.01)
  *B61G 3/16* (2006.01)
  *B61G 5/10* (2006.01)
  *B61G 9/22* (2006.01)

(52) U.S. Cl.
  CPC .............. *B60L 2200/26* (2013.01); *B61G 3/16* (2013.01); *B61G 5/10* (2013.01); *B61G 9/22* (2013.01)

(58) Field of Classification Search
  USPC .......................................................... 213/50
  See application file for complete search history.

(56) References Cited

U.S. PATENT DOCUMENTS

| | | | | |
|---|---|---|---|---|
| 1,507,857 A | * | 9/1924 | Robinson | B61G 5/08 248/53 |
| 1,587,802 A | | 6/1926 | Spence | |
| 2,089,259 A | * | 8/1937 | Herd | B61G 5/08 285/26 |
| 2,963,175 A | | 12/1960 | Thornhill | |
| 3,987,907 A | * | 10/1976 | Larsen | B61G 7/12 248/297.31 |
| 5,617,965 A | * | 4/1997 | Hawryszkow | B61G 1/28 213/188 |
| 5,979,679 A | * | 11/1999 | Ring | B61G 7/10 213/50 |
| 6,024,233 A | * | 2/2000 | Natschke | B61G 7/10 213/50 |
| 6,073,787 A | * | 6/2000 | Daugherty, Jr. | B61G 9/22 213/50 |
| 10,227,077 B2 | * | 3/2019 | Skowronek | B61G 7/14 |
| 2001/0023855 A1 | * | 9/2001 | Daugherty, Jr. | B61G 5/02 213/50 |
| 2007/0125739 A1 | | 6/2007 | Hogbring et al. | |
| 2008/0135511 A1 | | 6/2008 | Stepp | |
| 2017/0021844 A1 | * | 1/2017 | Skowronek | B61G 7/12 |
| 2021/0253146 A1 | * | 8/2021 | Harrysson | B61G 9/22 |

FOREIGN PATENT DOCUMENTS

| | | |
|---|---|---|
| CN | 206427045 U | 8/2017 |
| DE | 9304219 U1 | 6/1993 |
| DE | 19636225 A1 | 3/1998 |
| EP | 0 945 324 A1 | 9/1999 |
| WO | 2005/032906 A1 | 4/2005 |
| WO | 2015/135642 A1 | 9/2015 |

* cited by examiner

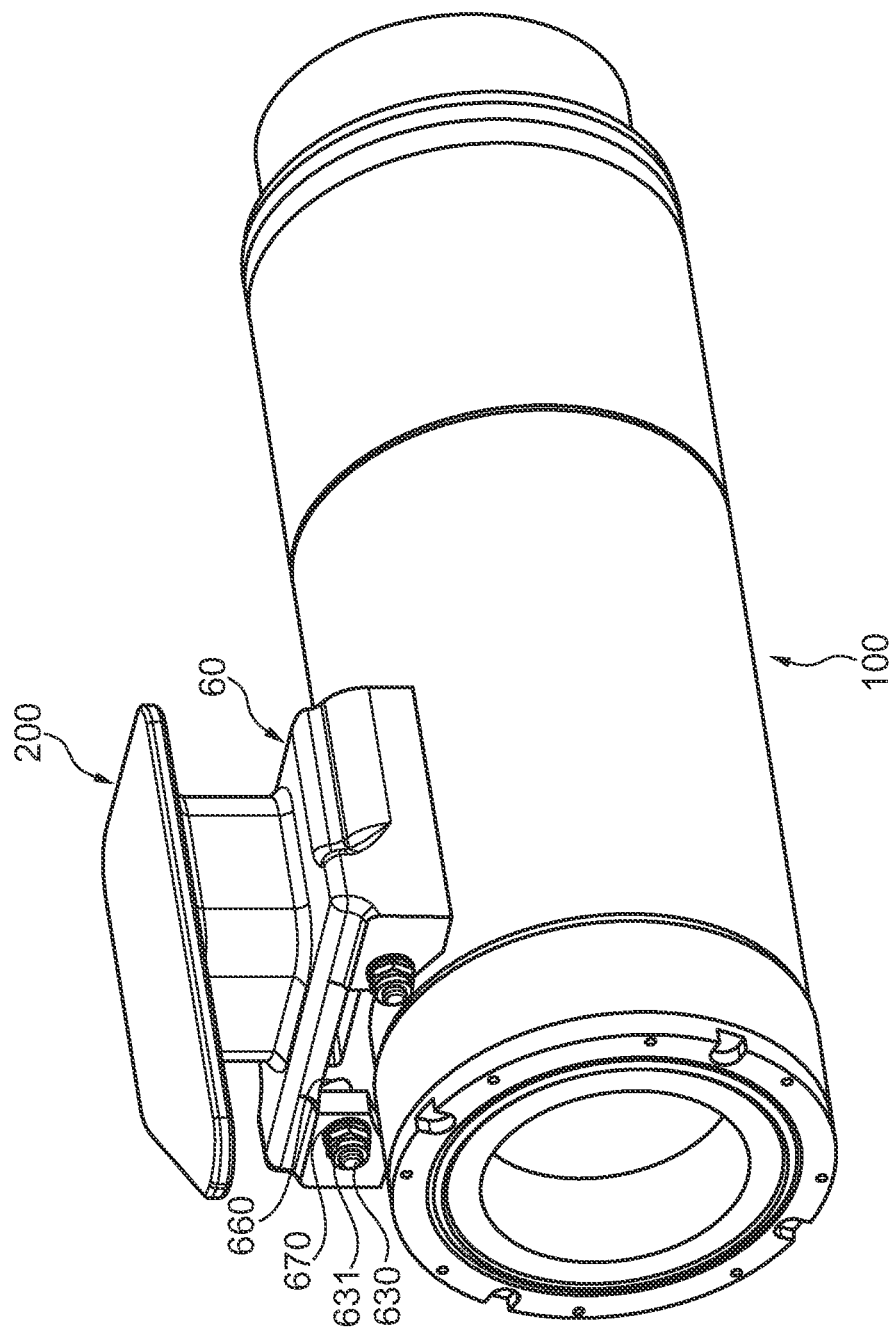

HOLDER FOR MOUNTING A SECOND PART ON A MAIN STRUCTURE BETWEEN CAR BODY ENDS OF A RAIL VEHICLE

TECHNICAL FIELD

The present invention relates to a holder for mounting a second part on a main structure between car body ends of a rail vehicle, comprising
a first holding structure having a first contact surface, the first holding structure being configured to be attached to a main structure;
a second holding structure having a second contact surface, the second holding structure being configured to be attached to a second part, and the second holding structure further being arranged to be mounted on the first holding structure with one of the first and second contact surfaces resting on the other;
a fastening device for fastening the second holding structure to the first holding structure to form a mounted state, the first and second contact surfaces being pressed against each other in the mounted state.

BACKGROUND

When coupling car bodies of trains together, a coupler is generally used to connect the two car bodies to each other. A number of parts are arranged between the car bodies, both for creating the coupling and for providing dampers and buffers to handle thrust and traction forces during operation. There may also be a gangway to allow persons to pass from one car body to the next.

These parts are supported in the vertical direction by the car bodies in a coupled state, but generally require additional vertical support in an uncoupled state. In prior art solutions, such support is provided by a holder that fixates one part needing support to another part that is able to provide it.

In the event of excessive force on the coupler, such as in the event of a crash for instance, some holders are configured to release the parts, often through the use of a sacrificial component such as a screw that can withstand smaller forces but will break at a crash. For such components it is especially important that fatigue can be avoided, since they cannot be made strong enough to withstand fatigue and at the same time weak enough to break as intended. As a result, sacrificial components need to be replaced frequently, leading to additional costs. An excessive force is herein defined as a force that is at least ten times larger than an operational force to which the holder is subjected during operation of the rail vehicle.

There are prior art solutions that attempt to provide such support but they generally suffer from considerable drawbacks, especially since some of the components may break due to fatigue arising from bending forces generated during operation of the train set. There is therefore a need for a new solution that can provide the support needed while also avoiding these drawbacks.

SUMMARY OF THE INVENTION

The object of the present invention is to eliminate or at least to minimize the problems mentioned above. This is achieved through a holder according to the description herein, having inclined surfaces that are pressed together in a mounted state. Thereby, the fastening device for the holder will be subjected to significantly smaller bending forces and will be able to provide the fastening required without risking fatigue.

According to an aspect of the invention, a front end of the first and second contact surfaces is closer to the horizontal axis than a rear end of the first and second contact surfaces. Thereby, through the inclination of the contact surfaces with the lower end in the direction D, i.e. towards the front end of the holder, an efficient management of forces can be achieved.

According to a further aspect of the invention, said fastening device is arranged to fasten the first and second holding structures to each other by creating a holding force in a first direction, said holding force being created by pressing the first and second holding structures against each other, and wherein the horizontal axis is parallel to or coincides with said first direction. Thereby, loads on the fastening device can be minimized and the advantageous effect of the tilted surfaces maximized.

According to another aspect of the invention, the fastening device comprises a screw that is arranged to be mounted in a first hole in the first holding structure and a second hole in the second holding structure and wherein the fastening device further comprises a nut, said screw and nut cooperating to create the mounted state by clamping the first and second holding structures together. Thereby, a stable and secure holding can be achieved, while also keeping the wear and tear on the fastening device low and allowing for a release of the fastening device if desired. For embodiments where the holder is configured to release the second part when subjected to large forces in connection with a crash, the screw is a sacrificial screw.

According to yet another aspect of the invention, the horizontal axis runs along said screw. This also serves to keep the wear and tear on the screw to a minimum and prevent bending forces.

According to a further aspect of the invention, the angle is less than 10 degrees, preferably 4 degrees. Thereby, bending forces can be efficiently absorbed by the slanted or wedge shaped surfaces.

According to a further aspect of the invention, the holder is configured to mount a support damper on a main buffer of a train coupler, and wherein the first part is a main buffer and the second part is at least one support damper. This is one especially advantageous embodiment of the present invention, since the fastening device is in this embodiment required to break when subjected to crash forces but should be prevented from breakage at lower forces even after long periods of use. Generally, crash forces are at least ten times larger than forces arising during normal operation.

Many additional benefits and advantages of the invention will become readily apparent to the person skilled in the art in view of the detailed description below.

DRAWINGS

Figure 2:
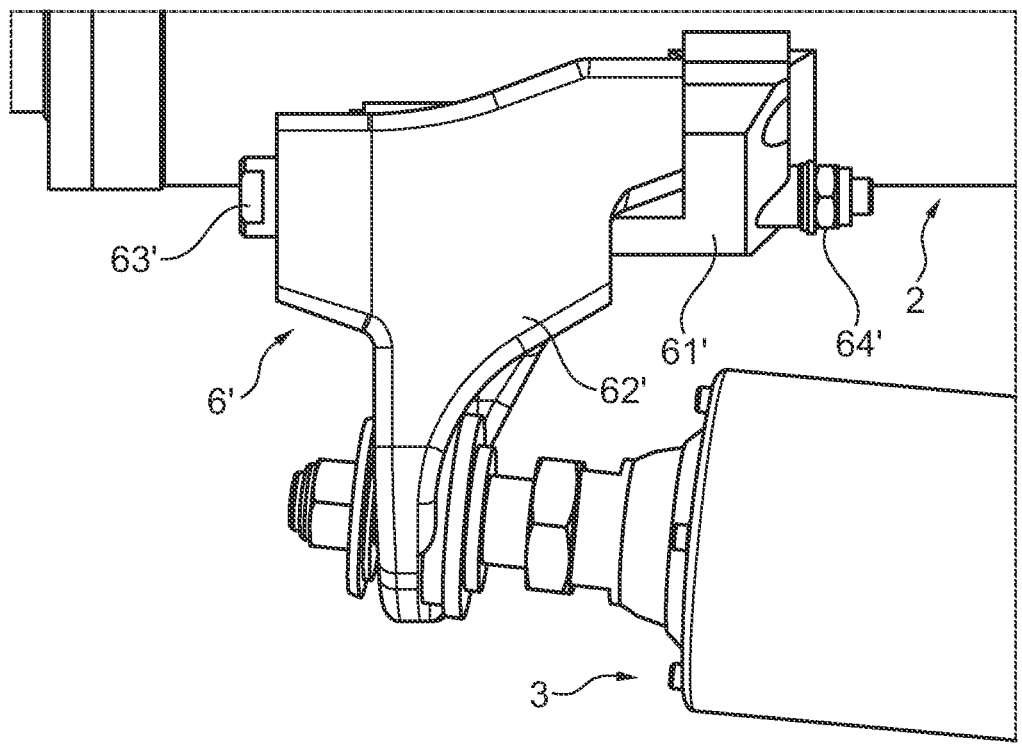
Figure 3A:
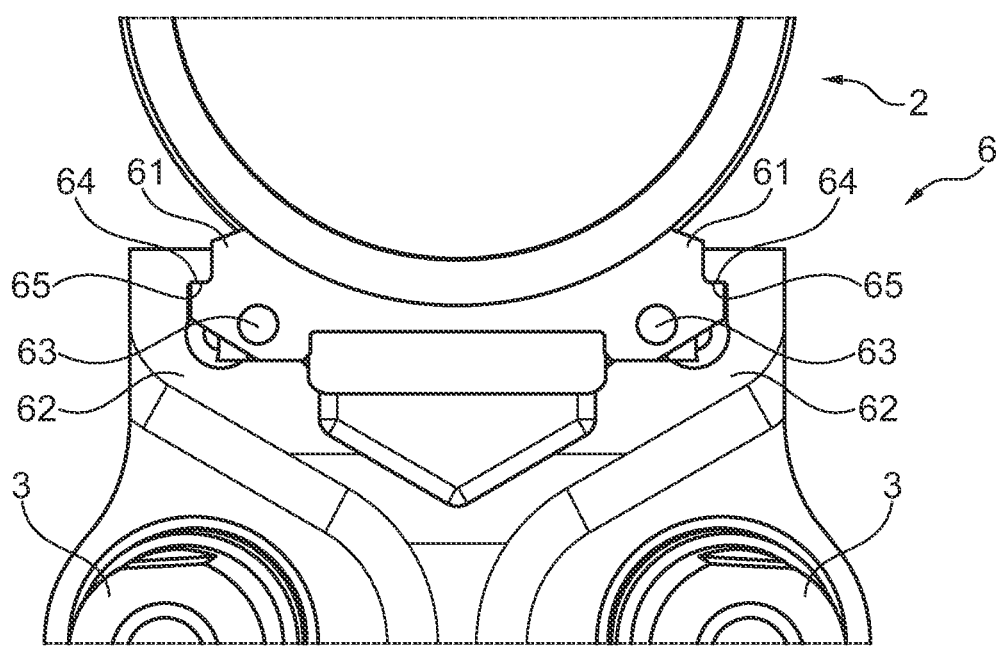
Figure 3B:
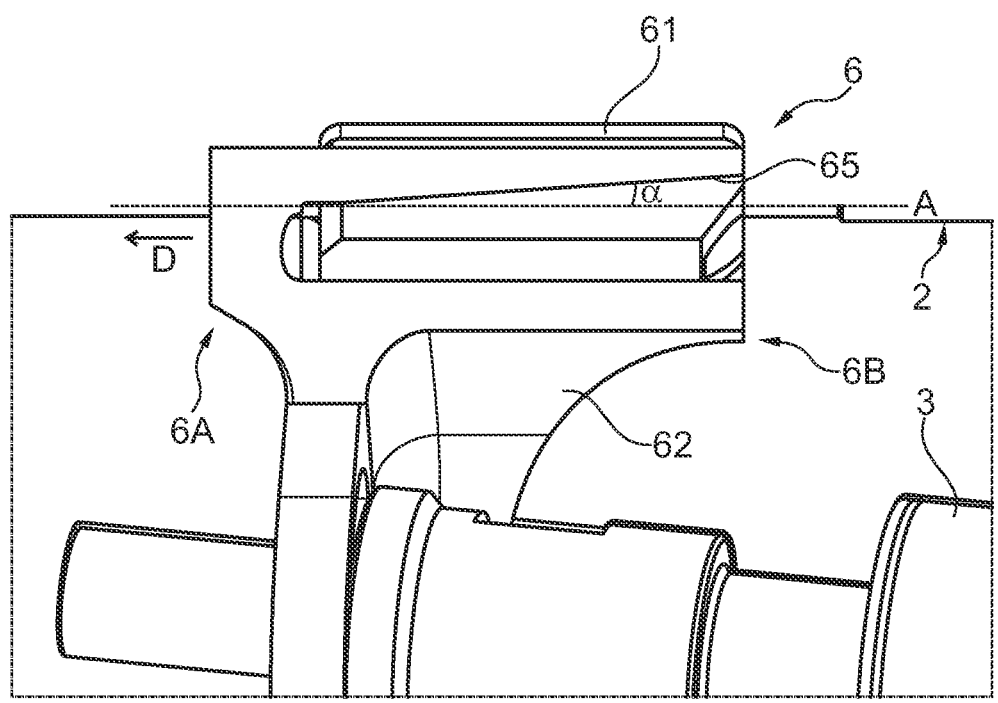
Figure 3C:
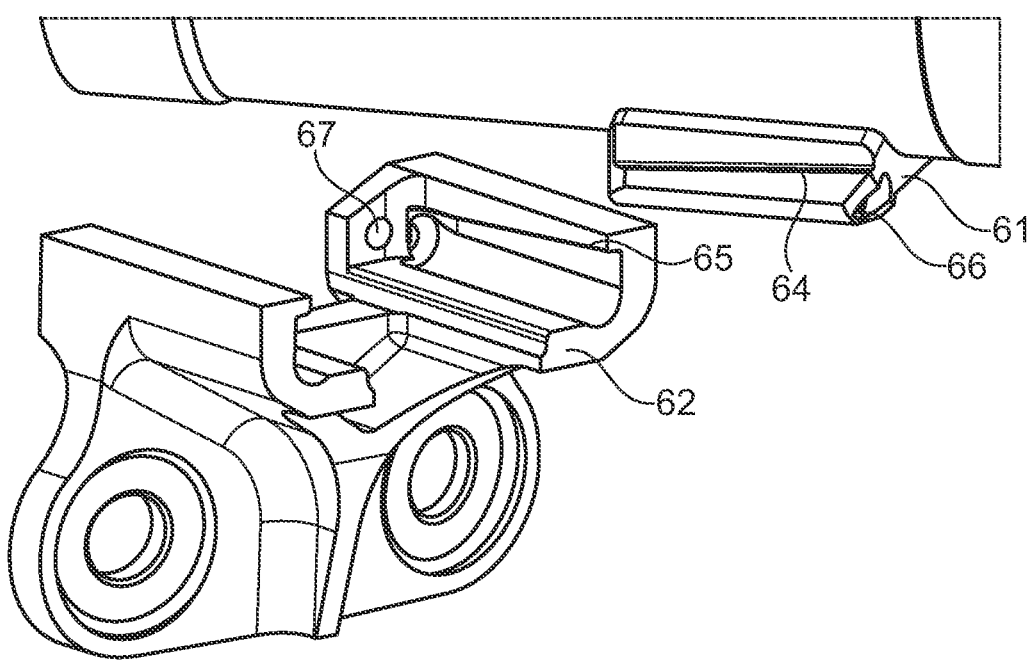
Figure 4B:
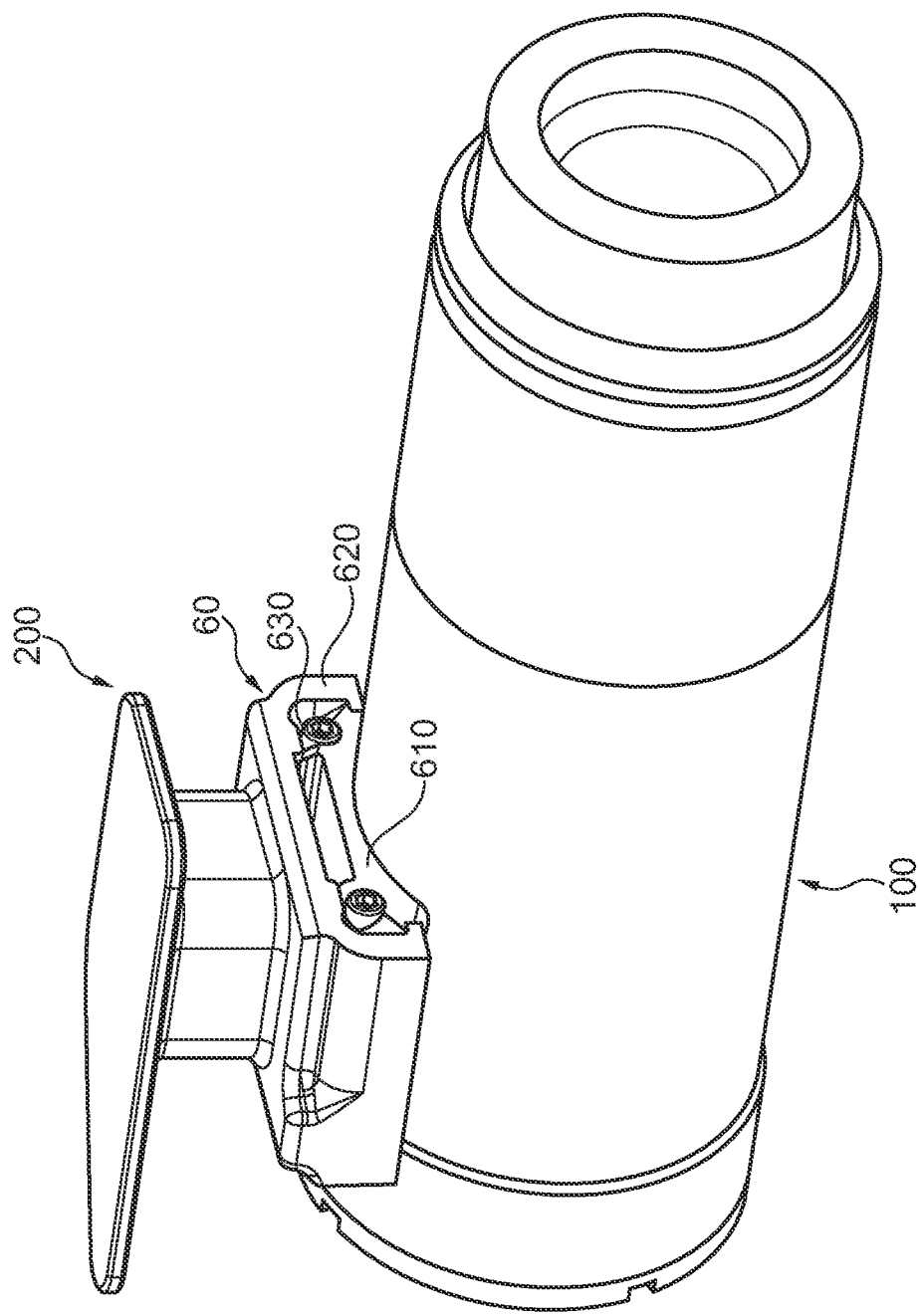
Figure 5:
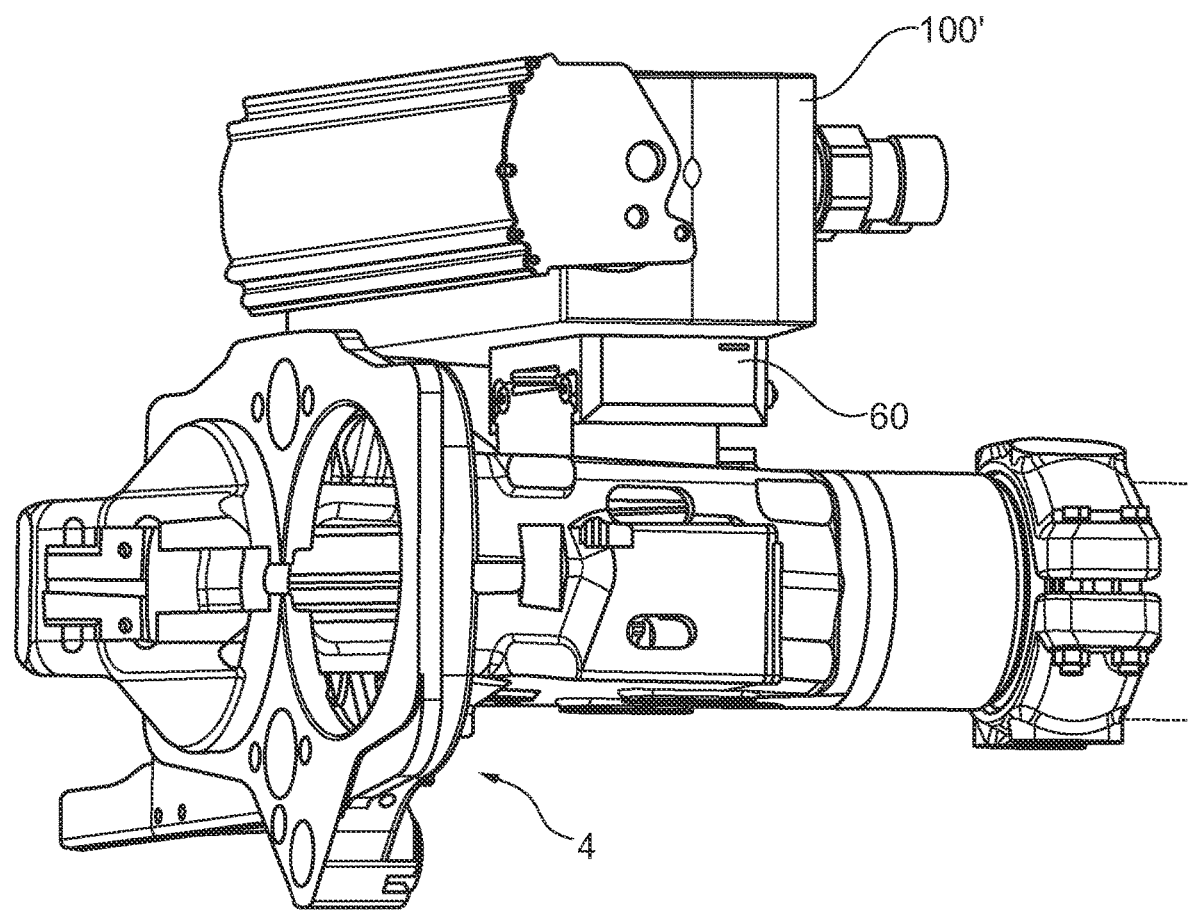
Figure 6:
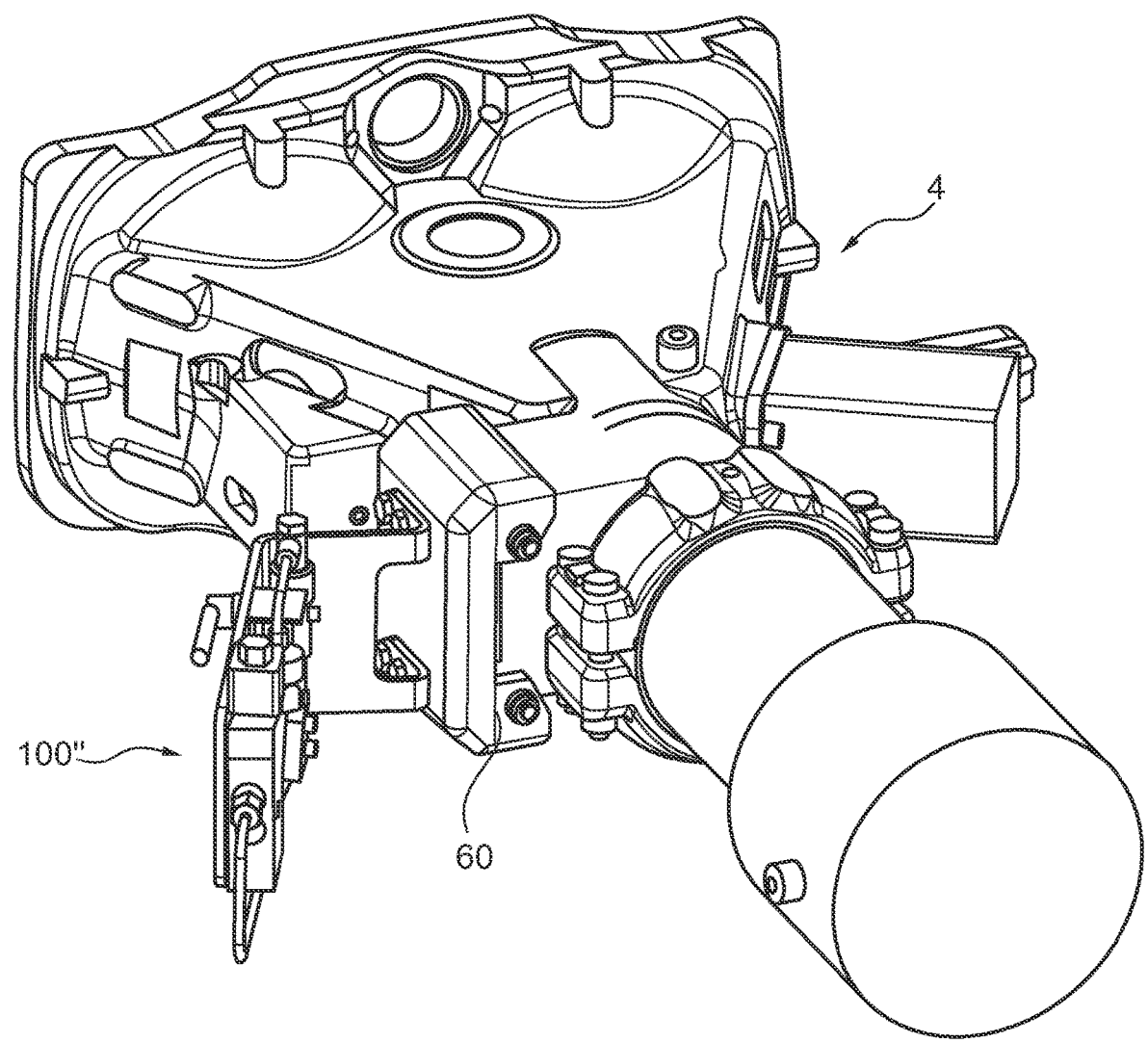

The invention will now be described in more detail with reference to the appended drawings, wherein FIG. 1 discloses a perspective view of a main buffer of a coupler, together with support dampers that are mounted on the main buffer by means of a holder according to a preferred embodiment of the present invention;

FIG. 2 discloses a perspective view of a holder for support dampers according to the prior art;

FIG. 3a discloses a perspective view of the holder of FIG. 1 seen from a rear end;

FIG. 3b discloses a cross-sectional perspective view of the holder of FIG. 1 from a side;

FIG. 3c discloses an exploded view of the holder of FIG. 1;

FIG. 4a discloses a first perspective view of a gangway support with a holder according to an embodiment of the invention;

FIG. 4b discloses a second perspective view of the gangway support with the holder of FIG. 4a;

FIG. 5 discloses a perspective view of an electrical coupler with a holder according to an embodiment of the invention;

FIG. 6 discloses a perspective view of a pneumatic block with a holder according to an embodiment of the invention.

DETAILED DESCRIPTION

The invention relates to a holder suitable for mounting a second part on a main structure between car body ends of a rail vehicle. The main structure may be a main buffer, coupler head or car body attachment, while the second part may be support dampers, a gangway support or an electrical coupler, among others. The part or parts may be included in a coupler, damper, gangway support or a pneumatic block, or any other structure suitable for placement between car body ends. The cars may be railway vehicles intended to be coupled to each other to form a train set, but may also be other car bodies for a rail vehicle that are to be coupled to each other. If the main structure is a main buffer having support dampers mounted thereon, the holder is configured to offer vertical support to the main buffer.

FIG. 1 discloses a coupler 1 for coupling car body ends to each other, the coupler 1 having a main buffer 2 mounted between a coupler head 4 and a car body attachment 5. The car body attachment 5 is generally fixedly attached to a car body, whereas the coupler head 4 comprises a coupling adapted to couple to a correspondingly formed coupler of another car body. The main buffer 2 is mounted in connection with a drawbar extending in a longitudinal direction between the coupler head 4 and the car body attachment 5, and serves to absorb longitudinal forces during operation of the car bodies. In order to support the main buffer 2 in an uncoupled state, support dampers 3 are arranged underneath with a rear end mounted on the car body attachment 5 and a front end mounted on the main buffer 2 by means of a holder 6.

The main functions and operation of the coupler are well known within the art and will not be described in the following.

In a prior art embodiment of a holder 6', support dampers 3 are mounted on main buffer 2 by a first holding structure 61' being fixedly attached to the main buffer 2 and a second holding structure 62' being configured to hold the front end of the support dampers 3. Screws 63' are inserted through holes in the first and second holding structures 61', 62', and cooperate with nuts 64' in order to clamp the first and second holding structures 61', 62 together.

Generally, the screw 63' is intended to fixate the holding structures 61', 62' during operation of the car bodies, but to break in the event of a collision so as not to interfere with the force absorption and damping of a crash management system. Thus, it is important that the screw 63' is able to release the support dampers 3 from the main buffer 2 when subjected to large forces involved in a collision, but it is also important to avoid breakage of the screw 63' during normal operation. A problem in this regard is that the screw 63' is exposed to bending forces that may eventually lead to fatigue and thereby to undesired breaking of the screw 63'.

In order to solve this problem, a holder 6 according to a preferred embodiment of the present invention is disclosed by FIG. 3a. Similarly to the prior art holder, a first holding structure 61 is mounted on a main structure 2 (in this embodiment the main buffer 2), preferably by welding but optionally by another method for fixedly joining one component to another. A second holding structure 62 is also provided, and arranged to hold a second part 3 (in this embodiment a front end of a support damper 3). In order to fasten the holding structures 61, 62 to each other, a fastening device 63 is provided and in this preferred embodiment comprises a screw that is mounted through a first hole and a second hole in the first and second holding structures 61, 62, respectively, and locked into place by a nut or similar.

In contrast to the prior art holder described above, however, the holder 6 according to the preferred embodiment comprises a first contact surface 64 on the first holding structure 61 and a second contact surface 65 on the second holding structure 62, wherein the first and second surfaces 64, 65 are arranged so that one of them rests on the other and so that they are pressed together when the holder 6 is in a mounted state, i.e. when the fastening device 63 is applied to fixate the first and second holding structures 61, 62 to each other. The second contact surface 65 thus acts as a counter surface to the first contact surface 64, and extends from a front end 6A towards a rear end 6B of the holder 6 (see FIG. 3b) in an upwards direction at a first angle α with respect to a horizontal axis A. The first and second surfaces 64, 65 when pressed together thereby serve to absorb bending forces and to prevent loads on the fastening device 63. Said angle α is in this preferred embodiment 4°. Generally, an angle of less than 30° will be able to achieve the desired prevention of loads to the fastening device 63, but it is advantageous to have an angle of less than 10°. Even more preferably, the angle could be less than 5° with 4° having shown especially good results during testing. The first angle α is at least 1° in order for the advantageous properties according to the present invention to arise. The first and second contact surfaces 64, 65 are in the preferred embodiment essentially planar surfaces. The fastening device 63 extends in a direction that is parallel to or coincides with the horizontal axis A.

The first and second contact surfaces 64, 65 each have a front end in the direction of the front end 6A of the holder 6, and a rear end in the direction of the rear end 6B of the holder 6. The front ends of the first and second contact surfaces 64, 65 are preferably lower in a vertical direction when in the mounted state than the rear ends that are higher in the vertical direction. The vertical direction is perpendicular to the horizontal axis A. Since the horizontal axis A is placed underneath the first and second contact surfaces 64, 65, this also means that the front ends of the first and second contact surfaces 64, 65 are closer to the horizontal axis A than the rear ends of the first and second contact surfaces 64, 65. The inclination of the contact surfaces 64, 65 is advantageous since it improves the absorption of forces in the direction along the horizontal axis A and in the opposite direction to the direction D.

The horizontal axis A extends in a horizontal direction in FIG. 3b, i.e. along a central axis of the fastening device 63 if the fastening device 63 comprises a screw. This is the same direction as a direction of force between the first and second holding structure 61, 62 when pressed together by the fastening device 63.

Preferably, the holder 6 is symmetrical and arranged to hold two support dampers 3, one on each side of the main buffer 2, and with one first contact surface 64 and one second contact surface 65 on each side of the main buffer 2. Since the holder 6 is symmetrical, however, only one of the sides will be described in the following.

It is to be noted that the invention may also comprise a holder having only one set of first and second surfaces, even if two sets are advantageous.

FIG. 3b discloses a cross-sectional perspective view of the holder 6, showing the second contact surface 65 of the second holding structure 62 and the angle α in relation to the horizontal axis A.

Similarly, FIG. 3c discloses an exploded view with the second holding structure 62 separated from the first holding structure 61 and shows the first contact surface 64 of the first holding structure 61 extending upwards at the angle α from the front end towards the rear end of the holder 6. Also shown is the second contact surface 65 on the second holding structure 62.

Moreover, FIG. 3c discloses a first opening 66 in the first holding structure 61 and a second opening 67 in the second holding structure 62, through which the fastening device 63 may be inserted during mounting. In this embodiment, the fastening device 63 comprises a screw, and when inserted through the second opening 67 and the first opening 66 said screw may cooperate with a nut in order to fixate the second holding structure 62 in relation to the first holding structure 61. This cooperation of the screw 63 and nut serves to create a holding force directed along the screw 63 in a first direction D, i.e. in the longitudinal direction in this embodiment, and it is to be noted that the horizontal axis A is parallel or coincides with this first direction D. The first direction D is the direction towards the coupler head 4 of the coupler 1. The holding force is created by pressing the first and second holding structure 61, 62 against each other.

The fastening device 63 may in another embodiment also comprise clamps or any other fastening means that are able to securely fixate two structures to each other. Depending on the specific fastening means used, the first and second openings 66, 67 may be adjusted to be suitable for insertion of those fastening means, or may alternatively be dispensed with altogether and allow for a clamping around the entire holder, or the clamping of a part of the holder. Regardless of the fastening means used in the fastening device 63, a holding force is created to hold the first and second holding structures firmly against each other, and it is advantageous to arrange the first and second surfaces 64, 65 at the angle α with respect to that holding force.

The mounting of the holder 6 will now be described in more detail.

The first holding structure 61 is welded on the main structure 2, in this embodiment the main buffer of a coupler. The second holding structure 62 is fitted on the front ends of a couple of support dampers 3 that serve as the second part 3 in this embodiment.

In order to mount the holder 6, the second holding structure 62 is placed against the first holding structure 61 and the first and second openings 66, 67 are aligned to allow for insertion of the screw 63. When aligning the first and second openings 66, 67, or indeed the first and second holding structures 61, 62 in general, it is important to also fit the first and second surfaces 64, 65 against each other and ascertain that they can be pressed together and act as a surface and counter surface in the mounted state by one of them resting on the other. If the surfaces 64, 65 are not properly aligned, they will not be able to absorb bending forces as intended, and in order to adjust them in relation to each other it may be necessary to move the second holding structure 62 in the longitudinal direction until a suitable position has been achieved with regard to the first holding structure 61.

Next, the screw 63 is inserted and a nut is applied to cooperate with the screw 63 and create the holding force that keeps the first and second holding structures 61, 62 together. After the fastening device 63 has been applied, the holder is in the mounted state and the first and second surfaces 64, 65 are firmly pressed against each other. When subjected to a force, the friction between the surfaces will prevent those forces from generating loads on other parts of the holder and the fastening device, allowing for a longer lifetime of the fastening device as described above.

When mounting a holder 6 having two symmetrical sides, it is advantageous to fit the second holding structure 62 carefully against the first holding structure 61 in order to ascertain that the first contact surface 64 is placed against the second contact surface 65 on both sides. Thanks to the holding of the second part 3, i.e. the support dampers 3, not being fixated but allowing the second holding structure 62 to move in the longitudinal direction and also to rotate slightly around a vertical axis, the fitting of the second holding structure 62 can be improved.

FIG. 4a-4b disclose an alternative embodiment, where a main structure in the form of a main support 100 is mounted on a second part in the form of a gangway support 200 by means of a holder 60. The holder 60 is similar to the holder 6 described above in relation to the preferred embodiment and serves to hold the gangway support 200 securely in place and minimize the risk of fatigue to the fastening device holding the holder 60 together. The fastening device 630 is in this embodiment also in the form of a screw that extends through a second opening 670 and a first opening 660 and cooperates with a nut 631. Thanks to the fastening device 630, a first holding structure 610 is fixed in relation to a second holding structure 620 and wedge shaped surfaces (not shown) that extend in a similar way as in the preferred embodiment above serve to prevent loading of bending forces on the fastening device 630.

FIG. 5 discloses a coupler where a second part in the form of an electrical coupler 100' is mounted on a main structure in the form of a coupler head 4 by means of a holder 60, and FIG. 6 discloses a second part in the form of a pneumatic block 100" mounted on a main structure in the form of the coupler head 4 by means of another holder 60. These holders 60 are very similar in construction to those disclosed above and will not be described in detail herein, but serve to illustrate some of the possible uses of the holder for holding a main structure and a second part together. Thus, the holder is suitable for use with any different components of a coupler or gangway located between car body ends.

In the preferred embodiment described above, the invention is especially beneficial since it increases the lifetime of the sacrificial screw that holds the support dampers in place on the main buffer, and thereby solves the problem of frequently changing the screw to prevent a breakage due to fatigue while at the same time making sure that the screw can break as needed in the event of a crash. In other embodiments, one main advantage of the present invention is that the fastening devices can be made more cost effective and additional material for them avoided. Thus, the advantages and benefits of the present invention are both with regard to safety and stability of the holder and with regard to cost effective solutions for holders on the coupler.

Many variations to the invention are possible within the scope of the appended claims, for instance in the fastening of the first holding structure on the main structure and the second holding structure on the second part. It is also to be noted that the embodiments described herein may be combined with each other in any way, apart from when it is explicitly stated that such a combination would be unsuitable.

The invention claimed is:

1. Holder for mounting a second part on a main structure between car body ends of a rail vehicle, comprising
   a first holding structure (61) having a first contact surface (64), the first holding structure (61) being configured to be attached to a main structure (2);
   a second holding structure (62) having a second contact surface (65), the second holding structure (62) being configured to be attached to a second part (3), and the second holding structure (62) further being arranged to be mounted on the first holding structure (61) with one of the first and second contact surfaces (64, 65) resting on the other; and
   a fastening device (63) for fastening the second holding structure (62) to the first holding structure (61) to form a mounted state, the first and second contact surfaces (64, 65) being pressed against each other in the mounted state, wherein
   the first and second contact surfaces (64, 65) in the mounted state each extend at a first angle ($\alpha$) in relation to a horizontal axis (A), said first angle ($\alpha$) being more than 1 degree and less than 30 degrees, and
   the fastening device (53) extends in a direction parallel to or coinciding with the horizontal axis (A).

2. Holder according to claim 1, wherein a front end of the first and second contact surfaces (64, 65) is lower in a vertical direction than a rear end of the first and second contact surfaces (64, 65) when the holder is in a mounted state.

3. Holder according to claim 2, wherein said fastening device (63) is arranged to fasten the first and second holding structures (61, 62) to each other by creating a holding force in a first direction (D), said holding force being created by pressing the first and second holding structures (61, 62) against each other, and the horizontal axis (A) is parallel to or coincides with said first direction (D).

4. Holder according to claim 3, wherein the fastening device (63) comprises a screw arranged to be mounted in a first hole in the first holding structure (61) and a second hole in the second holding structure (62) and the fastening device (63) further comprises a nut, said screw and nut cooperating to create the mounted state by clamping the first and second holding structures (61, 62) together.

5. Holder according to claim 4, wherein the horizontal axis (A) runs along said screw.

6. Holder according to claim 5, wherein the first angle ($\alpha$) is less than 30 degrees, preferably less than 10 degrees, more preferably 4 degrees.

7. Holder according to claim 2, wherein the fastening device (63) comprises a screw arranged to be mounted in a first hole in the first holding structure (61) and a second hole in the second holding structure (62) and the fastening device (63) further comprises a nut, said screw and nut cooperating to create the mounted state by clamping the first and second holding structures (61, 62) together.

8. Holder according to claim 7, wherein the horizontal axis (A) runs along said screw.

9. Holder according to claim 8, wherein the first angle ($\alpha$) is less than 30 degrees, preferably less than 10 degrees, more preferably 4 degrees.

10. Holder according to claim 7, wherein the first angle ($\alpha$) is less than 30 degrees, preferably less than 10 degrees, more preferably 4 degrees.

11. Holder according to claim 1, wherein said fastening device (63) is arranged to fasten the first and second holding structures (61, 62) to each other by creating a holding force in a first direction (D), said holding force being created by pressing the first and second holding structures (61, 62) against each other, and the horizontal axis (A) is parallel to or coincides with said first direction (D).

12. Holder according to claim 11, wherein the screw is a sacrificial screw that-is arranged for breaking when subjected to excessive force and thereby releasing the second holding structure (62) from the first holding structure (61) to release the second part (3) from the main structure (2).

13. Holder according to claim 11, wherein the fastening device (63) comprises a screw arranged to be mounted in a first hole in the first holding structure (61) and a second hole in the second holding structure (62) and the fastening device (63) further comprises a nut, said screw and nut cooperating to create the mounted state by clamping the first and second holding structures (61, 62) together.

14. Holder according to claim 13, wherein the horizontal axis (A) runs along said screw.

15. Holder according to claim 14, wherein the first angle ($\alpha$) is less than 30 degrees, preferably less than 10 degrees, more preferably 4 degrees.

16. Holder according to claim 13, wherein the first angle ($\alpha$) is less than 30 degrees, preferably less than 10 degrees, more preferably 4 degrees.

17. Holder according to claim 1, wherein the fastening device (63) comprises a screw arranged to be mounted in a first hole in the first holding structure (61) and a second hole in the second holding structure (62) and the fastening device (63) further comprises a nut, said screw and nut cooperating to create the mounted state by clamping the first and second holding structures (61, 62) together.

18. Holder according to claim 17, wherein the horizontal axis (A) runs along said screw.

19. Holder according to claim 1, wherein the first angle ($\alpha$) is less than 30 degrees, preferably less than 10 degrees, more preferably 4 degrees.

20. Holder according to claim 1, wherein the holder (6) is configured to mount a support damper on a main buffer of a train coupler, and the main structure (2) is a main buffer and the second part (3) is at least one support damper.

* * * * *